May. 5, 1936.　　　　　W. E. DEAN, JR　　　　　2,039,710

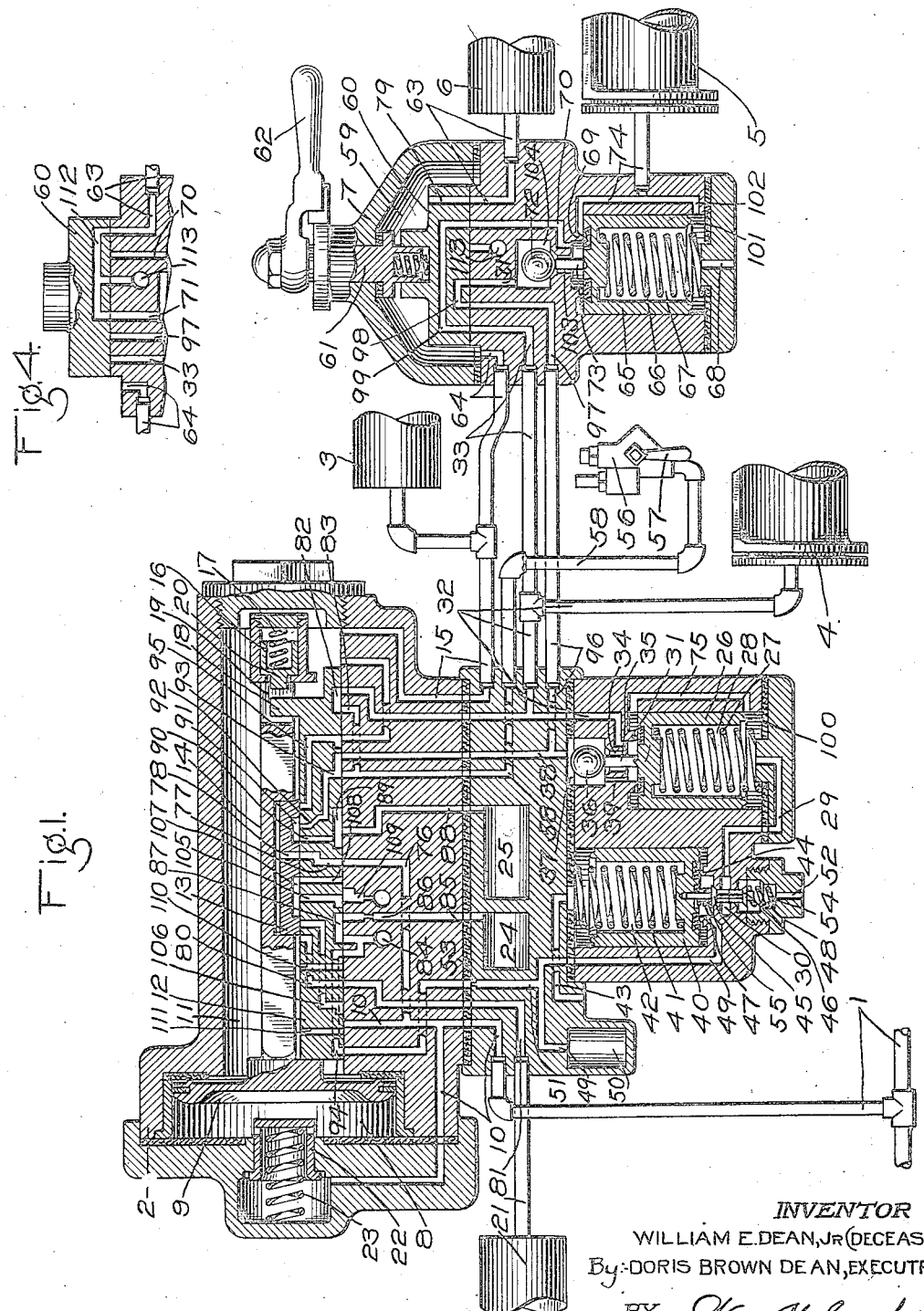

FLUID PRESSURE BRAKE

Filed Nov. 14, 1934　　　2 Sheets-Sheet 2

INVENTOR
WILLIAM E. DEAN, Jr.(DECEASED)
BY DORIS BROWN DEAN, EXECUTRIX

Wm. M. Cady
ATTORNEY

Patented May 5, 1936

2,039,710

UNITED STATES PATENT OFFICE 2,039,710

FLUID PRESSURE BRAKE

William E. Dean, Jr., deceased, late of Hamilton, Ontario, Canada, by Doris Brown Dean, executrix, Chautauqua, N. Y., assignor to The Westinghouse Air Brake Company, Wilmerding, Pa., a corporation of Pennsylvania Application November 14, 1934, Serial No. 752,984

23 Claims. (Cl. 303—23)

This invention relates to fluid pressure brakes, and more particularly to a fluid pressure brake equipment of the empty and load type in which the brakes are applied with greater force on loaded cars than on empty cars.

It has heretofore been proposed to provide an empty and load fluid pressure brake equipment having means adapted, when an application of the brakes is effected, to first supply fluid under pressure to the brake cylinder at a rapid rate, so as to cause a rapid application of the brake shoes to the car wheels, but limited to a degree such that the initial inshot of fluid under pressure will only be sufficient to develop a light braking force. Fluid under pressure is then supplied to the brake cylinder at a slower rate so as to effect a gradual building up of brake cylinder pressure.

It has been found that improved braking action is produced when, in braking a loaded car, the brake cylinder pressure resulting from the initial inshot of fluid under pressure to the brake cylinder is greater than the brake cylinder pressure obtained in empty car operation, and that in a train which includes both empty and loaded cars, when the initial inshot is thus varied according to whether the car is empty or loaded, a substantially uniform braking effect is produced throughout the length of the train, with consequent gentle gathering of slack.

One object of the present invention is to provide an improved empty and load fluid pressure brake equipment having means for varying the initial inshot of fluid under pressure to the brake cylinder according to whether the car is empty or loaded.

It has been found desirable, when effecting an emergency application of the brakes in freight trains, to build up brake cylinder pressure in three steps consisting of an initial inshot of fluid under pressure, such as is referred to above, followed by a delay period in which fluid under pressure is supplied to the brake cylinder at a restricted rate for a period of time sufficient to permit the train slack to run in gently, and finally fluid under pressure is supplied to the brake cylinder at a more rapid rate, so as to apply the brakes with the desired force.

Another object of the invention is to provide an improved fluid pressure brake equipment having means for varying the rate of brake cylinder pressure build-up during an emergency application of the brakes so as to provide the three-stage build-up noted above.

Other objects and advantages will appear in the following more detailed description of the invention.

In the accompanying drawings; Fig. 1 is a diagrammatic view, mainly in section, of an empty and load fluid pressure brake apparatus embodying the invention, the apparatus being shown in condition for loaded car operation, with the triple valve device in release position: Fig. 2 is a diagrammatic view of the triple valve device showing the parts in service position, with the empty cylinder inshot valve positioned for effecting an inshot of fluid under pressure to the brake cylinders; Fig. 3 is a similar view of the triple valve device with the parts in emergency position; and Fig. 4 is a fragmentary sectional view showing the connections established when the change-over valve device is adjusted for empty car operation.

As shown in Fig. 1, the empty and load fluid pressure apparatus may comprise a brake pipe 1, a triple valve device 2, an auxiliary reservoir 3, an empty brake cylinder 4, a load brake cylinder 5, a supplemental or load reservoir 6, a change-over valve device 7, an emergency reservoir 21, and a brake cylinder pressure retaining valve device 56.

The triple valve device may comprise a casing having the usual piston chamber 8 containing a piston 9 and communicating with the brake pipe 1 through a passage 10, and also having a valve chamber 11 containing a main slide valve 12 and a graduating slide valve 13 adapted to be actuated by the stem 14 of the piston 9, said valve chamber communicating with the auxiliary reservoir 3 through a passage and pipe 15.

Carried by the piston stem 14 at its rear end is a movable member 16 subject to the pressure of a coil spring 17. A flange 18 is carried by the main valve 12 at its rear end and extends upwardly into a slot 19 in the stem 14. The flange 18 is so positioned that upon forward movement of the stem 14, a projecting portion 20 of the member 16 engages said flange. It will, however, be noted that, with the triple valve parts in release position, as shown in Fig. 1, there is a space between the end of the projecting portion 20 of the member 16 and the rear surface of the flange 18 which, in effecting an application of the brakes, provides for a certain movement of the graduating slide valve 13 relative to the main slide valve 12 prior to the projecting portion engaging the flange 18. With the triple valve parts in service lap position, which will be described hereinafter, the same space is provided between the projection 20 and the rear surface of the flange 18 as when the triple valve parts are in release position, which, in effecting a reapplication of the brakes, provides for movement of the graduating slide valve relative to the main valve prior to the projection 20 engaging the flange 18.

Slidably mounted in the triple valve casing is a stop member 22 subject to the pressure of a coil spring 23 and adapted to be engaged by the piston 9 when in full service position.

In the triple valve casing are provided chambers 24 and 25 into which, under certain conditions, fluid under pressure is vented from the brake pipe.

An inshot valve device is operatively mounted in the triple valve casing and comprises a valve piston 26 subject on one side to the pressure of a coil spring 27 contained in a chamber 28 which is connected through a passage 29 to a chamber 30 associated with the timing valve device, which will presently be described.

The valve piston 26 is adapted to seat, on the opposite side, on an annular seat rib 31. The inner seated area of the valve piston is open to a passage 32 which leads through pipe 32 to the empty brake cylinder 4 and through pipe 33 to the change-over valve device 7, and is also open to a passage 34. With the valve piston seated on the seat rib 31, a projection 35 extending outwardly through the relatively large passage 34 from the inner seated area of the valve piston maintains a ball valve 36, which is contained in a chamber 37, unseated so that the brake cylinder passage 32 and the inner seated area of the valve piston are connected to the chamber 37 and thence through a passage 38 to the seat of the main slide valve 12. A restricted passage 39 connects the inner seated area of the valve piston with chamber 37, by-passing the ball valve 36. The outer seated area of the valve piston is connected through a passage 75 to the chamber 28.

The timing valve device is incorporated in the casing of the triple valve device and comprises a valve piston 40 subject on one side to the pressure of a coil spring 41 contained in a chamber 42 which is open to the atmosphere through a passage 43. The valve piston 40 is adapted to seat, on the opposite side, on an annular seat rib 44, which surrounds a chamber 47, and controls the operation of the oppositely seating valves 45 and 46 which are contained in chambers 47 and 48, respectively. Chamber 48 is constantly open to the atmosphere through the passage 52 and chamber 47 is open to a timing chamber 50 through a passage 49, and said passage 49 is in communication with a passage 51 leading to the seat of the main slide valve 12 and having a restricted portion 53. A spring 54 contained in chamber 48 acts on the valve 46, tending to seat said valve and to unseat the valve 45. A spring 55 contained in chamber 47 and interposed between the timing valve piston 40 and the valve 45 acts on said valve, when the valve piston 40 is seated on the seat rib 44, to seat the valve 45 and to unseat the valve 46. Intermediate the valves 45 and 46 is the chamber 30 which is connected by passage 29 to chamber 28 below the inshot valve piston 26.

The brake cylinder pressure retaining valve device 56 may be of the usual type having a controlling handle 57 which may be set in one position, so that the brake cylinder exhaust passage and pipe 58 are connected to the atmosphere, and which may be set in another position, in which a predetermined pressure is retained in the brake cylinders.

The change-over valve device 7 may comprise a casing having a valve chamber 59 containing a rotary valve 60 adapted to be operated by a stem 61. The stem 61 carries an operating handle 62 adapted to be operated manually to effect rotation of the rotary valve 60. The load reservoir 6 is connected to the seat of the rotary valve 60 by a passage and pipe 63. The valve chamber 59 is continuously connected, by a passage and pipe 64, to pipe 15 leading to the valve chamber 11 of the triple valve device 2.

Incorporated in the casing of the change-over valve device 7 is an inshot valve for controlling the initial inshot of fluid under pressure to the empty brake cylinder 4 and to the load brake cylinder 5 when the equipment is conditioned for loaded car braking. Said inshot valve comprises a valve piston 65 subject on one side to the pressure of a coil spring 66 contained in a chamber 67 which is continuously connected to the atmosphere through a passage 68. The valve piston is adapted to seat in one direction on an annular seat rib 69 and when so seated, the inner seated area of said valve piston is open to a passage 70 which leads to the seat of the rotary valve 60, and is also open to a passage 103. With the valve piston seated on the seat rib 69, a projection 73 extending outwardly through passage 103 from the inner seated area of the valve piston maintains the ball valve 72, which is contained in a chamber 104, unseated. The outer seated area of the valve piston is connected by a passage and pipe 74 to the load brake cylinder 5, the passage 74 being also connected by a passage 102 to chamber 67 past the lower end of the valve piston when said piston is seated against the seat rib 69. When the valve piston is seated in the opposite direction, communication from passage 102 to chamber 67 is cut off.

In operation, fluid under pressure supplied to the brake pipe 1 in the usual manner flows therefrom through passage 10 to the piston chamber 8 of the triple valve device 2, forcing the piston 9 to its innermost, or release position, as shown in Fig. 1. Fluid under pressure supplied to passage 10 also flows to the valve chamber 11 through passage 76, port 77 in the main slide valve 12 and port 78 in the graduating slide valve 13. Fluid supplied to valve chamber 11 flows therefrom to the emergency reservoir 21 past the end of the graduating slide valve 13, then through port 80 in the main slide valve 12 and passage and pipe 81. From valve chamber 11, fluid under pressure also flows to the auxiliary reservoir 3 by way of passage and pipe 15, and to the valve chamber 59 of the change-over valve device 7 by way of passage and pipe 15 and pipe and passage 64.

If the change-over valve device is in loaded postion, as shown in Fig. 1, fluid under pressure supplied to the rotary valve chamber 59 flows through a port 79 in the rotary valve 60 and passage and pipe 63 to the load reservoir 6. Thus, the slide valve chamber 11 of the triple valve device, the auxiliary reservoir 3, the emergency reservoir 21, the rotary valve chamber 59 and the load reservoir 6 are charged to the pressure normally carried in the brake pipe.

The empty brake cylinder 4 is connected to the pressure retaining valve device 56 through pipe and passage 32, cavity 82 in the main slide valve 12, passage 83 and passage and pipe 58, so that the empty brake cylinder is open either directly to the atmosphere, or pressure is retained by the pressure retaining valve device 56, according to the position of the handle 57.

The load brake cylinder 5 is connected to the atmosphere by way of pipe and passage 74, passage 102, past the lower end of valve piston 65, chamber 67 and passage 68.

Chamber 24 is connected to an atmospheric exhaust port 84 through a passage 85 having a restricted portion 86 and a cavity 87 in the main slide valve 12. Chamber 25 is connected to passage 58 leading to the pressure retaining valve device 56 through a passage 88, cavity 89 and port 90 in the main slide valve 12, cavity 91 in the graduating slide valve 13, and port 92 and cavity 93 in the main slide valve. The timing chamber 50 is vented to the atmosphere by way of passages 49 and 51, cavity 94 in the main slide valve 12 and the atmospheric exhaust port 84.

When it is desired to effect a service application of the brakes, the pressure in the brake pipe 1, and consequently in the piston chamber 8 of the triple valve device 2, is gradually reduced in the usual manner. Upon a predetermined light reduction in pressure in the piston chamber 8, the pressure of the fluid in the valve chamber 11 shifts the triple valve piston 9 and graduating slide valve 13 toward the left hand and relative to the main slide valve 12. In thus moving, the graduating slide valve 13 first laps the port 77 in the main slide valve 12, so as to prevent back flow of fluid under pressure from the valve chamber 11 and connected auxiliary reservoir 3 to the brake pipe, after which the projection 20 on the movable member 16 engages the flange 18. Further movement of said piston and graduating slide valve to the left relative to the main slide valve is thus resisted by the spring 17 but when the brake pipe pressure is reduced a predetermined but light amount the resistance of the spring 17 is overcome, permitting the piston to move the graduating slide valve to quick service position.

In quick service position of the graduating slide valve 13, the cavity 91 connects ports 77 and 90 in the main slide valve 12, and since port 77 is in registration with the brake pipe passage 76, and cavity 89, which is open to port 90, registers with passage 88 leading to chamber 25, fluid under pressure is vented from the brake pipe to said chamber. This venting produces a sudden, local quick service reduction in pressure in the brake pipe 1 for hastening the operation of the triple valve device on the next car in a train, which then operates in a similar manner, and in this way a quick serial response to the brake pipe reduction is transmitted from one car to the next throughout the length of the train.

As a result of the above described quick service venting of fluid from the brake pipe, the triple valve piston 9 and main slide valve 12 are moved to service application position, as shown in Fig. 2, in which position port 95 in the main slide valve 12 registers with the brake cylinder passage 38, so that fluid under pressure supplied from the auxiliary reservoir 3 and the load reservoir 6 to the valve chamber 11 flows therefrom to the empty brake cylinder 4 through port 95, passage 38, chamber 37, past the unseated ball valve 36, passage 34, and passage and pipe 32. Fluid under pressure is also supplied from passage 38 to the empty brake cylinder through an additional communication which comprises passage and pipe 96, passage 97 in the control valve device 7, cavity 98 in the rotary valve 60, passage 71, chamber 104, past the unseated ball valve 72, passages 103 and 70, cavity 99 in the rotary valve 60, passage and pipe 33, and pipe 32.

Now, when the pressure in the empty brake cylinder has been increased to, say, 10 pounds, fluid at this pressure acting on the inner seated area of the valve piston 26 causes said valve piston to move to its lowermost position against the opposing pressure of the spring 27, unseating the valve piston from the seat rib 31 and seating the valve 100 at the lower end of the valve piston.

When the valve piston 26 is thus moved, the passage 75 is lapped and the ball valve 36, due to the force of gravity, seats and closes communication from chamber 37 to passage 32 by way of the relatively large passage 34. With the ball valve 36 seated, fluid under pressure supplied to chamber 37 from the auxiliary reservoir 3 and the load reservoir 6 flows to the empty brake cylinder 4 at a restricted rate through the restricted passage 39. However, fluid under pressure supplied to passage 38 continues to flow to the empty brake cylinder at a relatively fast rate through passage and pipe 96, passage 97 in the change-over valve device 7, cavity 98 in the rotary valve 60, passage 71, past the unseated ball valve 72, passage 70, cavity 99 in the rotary valve 60, passage and pipe 33, and pipe 32.

When the pressure in the empty brake cylinder 4 has been increased to a predetermined pressure, say twenty pounds, fluid at this pressure acting on the inner seated area of the valve piston 65 causes said valve piston to move away from the seat rib 69, against the pressure of the spring 66, exposing the full area of said valve piston to the pressure of fluid supplied through passage 70, so that said piston is promptly shifted to its lower seat, seating the valve 101.

When the valve piston 65 is thus moved, the load brake cylinder exhaust passage 102 is lapped by said valve piston, communication is opened from passage 70 to passage 74, and the ball valve 72 seats by gravity. With the ball valve 72 seated, the communication from the supply passage 38 to the empty brake cylinder 4 by way of the passages in the change-over valve 7 is closed, so that the supply of fluid under pressure to the empty brake cylinder at a fast rate is cut off. The opening of communication from passage 70 to passage 74 connects the load brake cylinder to the empty brake cylinder and the empty brake cylinder pressure will then equalize into the load brake cylinder, after which the pressure in both brake cylinders is gradually increased by the restricted flow of fluid through the restricted passage 39. It will here be understood that upon the equalization of the empty brake cylinder pressure into the load brake cylinder, the reduced pressure resulting from such equalization and acting on the entire area of the upper face of the valve piston 65 is sufficient to maintain said valve piston in its lowermost position against the opposing pressure of the spring 66.

In service application position of the main slide valve 12, ports 105 and 106 in the main slide valve register with passages 85 and 10, respectively, and cavity 107 in the graduating slide valve 13 connects the ports 105 and 106, so that fluid under pressure is vented from the brake pipe to chamber 24 at a restricted rate, as controlled by the restricted portion 86 of the passage 85. This reduction in brake pipe pressure is sufficient to insure the triple valve piston, and consequently the slide valves, remaining in a position to supply fluid under pressure to the brake cylinder so that an effective brake cylinder pressure will be developed. The rate at which this reduction in pressure is effected is relatively slow, so as to dampen or smooth out surges in the fluid in the brake pipe.

When the pressure of the fluid in the valve chamber 11 of the triple valve device, and in the connected auxiliary reservoir 3 and load reservoir 6, has been reduced by flow to the brake cylinders to a degree slightly less than the reduced brake pipe pressure in piston chamber 8, the piston 9 moves the graduating slide valve 13 back to service lap position, in which the supply of fluid to the brake cylinders is cut off by the lapping of port 95 in the main valve 12. In service lap position, the cavity 107 in the graduating slide valve 13 connects port 105 with a port 108 in the main slide valve, which port 108 registers with an atmospheric exhaust port 109. Fluid is thus vented from chamber 24 to the atmosphere for the period of time the graduating slide valve remains in service lap position, and in a succeeding brake pipe reduction, the amount of reduction in brake pipe pressure will therefore depend upon the time the triple valve parts remain in service and service lap position in the previous brake pipe reductions.

When the graduating slide valve is in service lap position and a succeeding brake pipe reduction is effected, as above mentioned, to effect an increase in brake cylinder pressure, the piston 9 will be caused to operate to shift the graduating slide valve again to its full service position, as shown in Fig. 2. Due to the space between the end of the projection 20 of the member 16 and the rear surface of the flange 18 on the main slide valve, the piston and graduating slide valve will move a sufficient distance, without opposition by the action of the spring 17 and member 16, to open the port 95 to the valve chamber 11 and to cause cavity 107 to again connect ports 105 and 106. Thus, fluid under pressure is again supplied to the brake cylinders and fluid under pressure is again vented from the brake pipe at a restricted rate.

To effect a release of the brakes after a service application, fluid under pressure is supplied to the brake pipe 1 and flows therefrom to the triple valve piston chamber 8. The triple valve piston 9 is therefore operated to shift the graduating slide valve 13 and the main slide valve 12 back to release position, as shown in Fig. 1. In this position, if a complete release of the brakes is desired, the retaining valve handle 57 is turned down to the direct release position, permitting fluid supplied to pipe and passage 32 from the empty brake cylinder 4 and also permitting fluid supplied to said pipe and passage from the load brake cylinder 5 by way of pipe and passage 74, past the unseated valve piston 65, passage 70, cavity 99 in the rotary valve 60, and passage and pipe 33 to be vented to the atmosphere by way of cavity 82 in the main slide valve 12, passage 83, passage and pipe 58, and the retaining valve device 56. Fluid supplied from the brake cylinders to passage 32 also flows to passage 34 and unseats the ball valve 36 and flows thence to the atmosphere through the retaining valve device 56 by way of chamber 37, passage 38, cavity 93 in the main slide valve 12 and passage and pipe 58. Fluid may also be vented from the load brake cylinder to the vented passage 38 by way of pipe and passage 74, past the unseated valve piston 65, passage 103, past the ball valve 72, chamber 104, passage 71, cavity 98 in the rotary valve 60 of the change-over valve device 7, passage 97, and pipe and passage 96.

Now, when fluid under pressure has been almost completely vented from the empty and load brake cylinders 4 and 5, respectively, the springs 27 and 66 act to move the valve pistons 26 and 65, respectively, to their upper seated or normal positions. With the valve piston 65 in its normal position, communication is closed off from passage 74 to passages 70 and 103, and passage 102 is open past the valve 101 at the lower end of the valve piston, so that fluid under pressure is completely vented from the load brake cylinder 5 to the atmosphere by way of pipe 74, passage 102, past the valve 100, chamber 67, and passage 68. The complete venting of fluid from the empty brake cylinder 4 is by way of the vented passages 32 and 38.

With the retaining valve handle in direct release position, chamber 25 is vented to the atmosphere through passage 88, cavity 89 and port 90 in the main slide valve 12, cavity 91 in the graduating slide valve 13, port 92 and cavity 93 in the main slide valve, passage and pipe 58, and the retaining valve device 56. Chamber 24 is also vented to the atmosphere, through passage 85, cavity 87 in the main slide valve, and the amtospheric exhaust passage 84.

The auxiliary reservoir 3 and the load reservoir 6 are recharged from the brake pipe to the pressure carried therein in the manner hereinbefore described in connection with the initial charging of said reservoirs. The movement of the main slide valve 12 to release position brings port 80 into registration with passage 81, so that fluid under pressure is supplied from the fully charged emergency reservoir 21 to the slide valve chamber 11 and thence to the auxiliary reservoir 3 and the load reservoir 6. Due to this supply of fluid under pressure from the emergency reservoir to the auxiliary and load reservoirs, the amount of fluid taken from the brake pipe at the front end of the train is small and this hastens the rate at which the brake pie is charged at the rear end of the train.

If it is desired to retain pressure in the brake cylinders, as when operating upon a descending grade, the retaining valve handle 57 is turned up to the pressure retaining position. In this event, when the triple valve parts are moved to release position, a predetermined degree of pressure is retained in the empty and load brake cylinders, 4 and 5, respectively, and also in chamber 25. Upon a successive reduction in brake pipe pressure, the extent of said reduction by flow to chamber 25 will be reduced due to the pressure retained in said chamber.

To effect an emergency application of the brakes, fluid under pressure is suddenly vented from the brake pipe 1 and the connected triple valve piston chamber 8, with the result that the triple valve parts are moved to emergency position, as shown in Fig. 3.

In emergency position of the main slide valve 12, cavity 89 connects passage 76, leading to the brake pipe, to passage 88, leading to chamber 25, and ports 105 and 106, which are connected by cavity 107 in the graduating slide valve 13, register, respectively, with passage 85, leading to chamber 24 and with the brake pipe passage 10. Thus, the brake pipe is vented into chambers 24 and 25 and this local venting at the triple valve device operates to hasten the propagation of emergency action through the train.

In effecting an emergency application of the brakes, the triple valve device operates in the same manner as in effecting a service application of the brakes, to supply fluid under pressure from the auxiliary reservoir 3 and from the load reservoir 6 through the slide valve chamber 11 and port 95 in the main slide valve 12 to the brake cylinder passage 38. The movement of the main slide valve to emergency position brings a port 110 into registration with passage 81 leading to the emergency reservoir 21, so that fluid under pressure is supplied from said reservoir to the slide valve chamber 11 and from thence through port 95 to passage 38.

Thus, fluid under pressure is supplied to passage 38 from the auxiliary reservoir, the load reservoir, and the emergency reservoir, and the fluid thus supplied to said passage flows therefrom, in the same manner as in a service application, first to the empty brake cylinder 4 and then to the load brake cylinder 5, initially at a rapid rate and then at a restricted rate, as controlled by the restricted passage 39. This restricted rate of supply of fluid under pressure to the brake cylinders continues for a period of time controlled by the operation of the timing valve, in a manner which will now be described.

In emergency position of the main slide valve 12, a port 111 therein registers with passage 51, so that fluid under pressure is supplied from the valve chamber 11 through said port and passage to passage 49 and thence to the timing reservoir 50 and to the inner seated area of the timing valve piston 40, at a rate controlled by the restricted portion 53 of the passage 51, the opposite side of the valve piston 40 being subject to the pressure of the spring 41. When the pressure of the fluid in the timing reservoir, and acting on the inner seated area of the valve piston 40, is increased to a predetermined degree, depending upon the value of the spring 41, the valve piston 40 will be lifted from the seat rib 44, exposing the full area to the pressure of the fluid supplied through passage 49, so that said piston is promptly shifted to its upper seat. This movement of the valve piston permits the spring 54 to seat the valve 46 and to unseat the valve 45. The seating of valve 46 closes off communication from chamber 30 to the vented chamber 48 and the unseating of valve 45 opens communication from passage 49 to chamber 30, so that fluid under pressure supplied to passage 49 from the valve chamber 11 flows therefrom past the unseated valve 45, to chamber 30 and thence through passage 29 to chamber 28 below the valve piston 26. The valve piston 26 is moved by this supply of fluid under pressure to chamber 28 to its seat on the seat rib 31, thereby unseating the ball valve 36. With said ball valve unseated, communication is reestablished from chamber 37 through the relatively large area passage 34 to passage 32 and thence to the empty brake cylinder 4 and the load brake cylinder 5, which permits fluid under pressure supplied to passage 38 to flow to the brake cylinders at a rapid rate until the pressure in said brake cylinders builds up to equalization with the pressure in the auxiliary reservoir, the load reservoir, and the emergency reservoir.

To effect a release of the brakes after an emergency application, fluid under pressure is supplied to the brake pipe 1 and flows therefrom to the triple valve piston chamber 8, whereupon the piston 9 is operated to shift the main slide valve 12 and the graduating slide valve 13 to release position, as shown in Fig. 1, wherein fluid under pressure is released from the empty and load brake cylinders, 4 and 5 respectively, in substantially the same manner as hereinbefore described in connection with releasing the brakes after a service application. With the main slide valve in release position, cavity 94 therein connects passage 51 with the atmospheric exhaust port 84, so that fluid is vented from the timing chamber 50 and from the lower side of the valve piston 40, which permits the spring 41 to seat said valve piston on the seat rib 44. This movement of the valve piston 40 to its lower seated position causes the valve 45 to be seated and the valve 46 to be unseated. With the valve 46 unseated, chamber 28 below the inshot valve piston 26 is vented to the atmosphere. Chambers 24 and 25 are vented to the atmosphere in the same manner, hereinbefore described, as when releasing after a service application of the brakes, and the auxiliary reservoir 3, the load reservoir 6 and the emergency reservoir 21 are recharged to the pressure carried in the brake pipe in the same manner as during the initial charging, which has already been described.

When it is desired to condition the apparatus for empty car operation, the rotary valve 60 of the change-over valve device 7 is turned, by means of the operating handle 62, to the empty car position, as shown in Fig. 4. In this position of the rotary valve, communication from the load reservoir 6 to the slide valve chamber 11 is cut off and said reservoir is now vented to the atmosphere through pipe and passage 63, cavity 112 in the rotary valve 60 and the atmospheric exhaust passage 113. Communication from passage 70 to passage 33 is now cut off, passage 70 being blanked by the rotary valve and communication from passage 71 to passage 97 is closed and passage 71 is connected through cavity 112 in said rotary valve to the atmospheric exhaust passage 113, and thus the communications through which fluid under pressure is supplied to the valve piston 65 are cut off and said valve piston is thereby rendered inoperative to control the supply of fluid under pressure to the empty and load brake cylinders. The object in connecting passage 71 to the atmospheric exhaust passage 113 is to permit venting of fluid under pressure from the load brake cylinder 5 in the event that a brake application has been effected just prior to the movement of the change-over valve device 7 to the position for empty car braking, that is, while said device is still in position for loaded car braking. It will be seen that, the valve piston 65 having been moved to its lowermost seated position by said brake application, the venting of passage 71 permits venting of fluid under pressure therethrough from the upper side of said valve piston and from the load brake cylinder until the valve piston is moved by the spring 66 to its seated position on the seat rib 69, whereupon the remaining fluid under pressure in the load brake cylinder is vented to the atmosphere through pipe 74, passage 102, past the valve 101 at the lower end of said valve piston and thence through chamber 67 and the atmospheric passage 68.

With the change-over valve device 7 in empty car position, if it is desired to effect a service application of the brakes, the brake pipe pressure is gradually reduced in the usual manner, which causes the triple valve device to operate to effect a quick service reduction in brake pipe pressure and to supply fluid under pressure from the auxiliary reservoir 3 to the brake cylinder passage 38 in the same manner as hereinbefore described in connection with the effecting of a service application of the brakes with the apparatus conditioned for loaded car operation.

Fluid under pressure supplied to passage 38 flows therefrom to the empty brake cylinder 4 through chamber 37, past the unseated ball valve 36, then through the relatively large area passage 34, and passage and pipe 32, and thus an inshot of fluid under pressure is supplied to said brake cylinder. When the brake cylinder pressure has been increased to around ten pounds, the inshot valve piston 26 will be moved to its lowermost seated position, permitting the ball valve to seat and causing fluid under pressure to be supplied therefrom to the brake cylinder at a rate controlled by the restricted passage 39.

In effecting a release of the brakes following a service application with the apparatus conditioned for empty car braking, fluid under pressure is released from the empty brake cylinder 4 in the same manner as hereinbefore described in connection with the effecting of a release of the brake following a service application with the apparatus conditioned for loaded car operation.

With the apparatus conditioned for empty car braking, when brake pipe pressure is suddenly vented to effect an emergency application of the brakes, fluid under pressure is supplied from the auxiliary reservoir 3 and the emergency reservoir 21 to the empty brake cylinder 4 in the same manner as hereinbefore described in connection with the effecting of a service application of the brakes with the apparatus conditioned for empty car braking, that is, fluid under pressure is supplied to said brake cylinder initially at a rapid rate through the relatively large area passage 34 and then, when the valve piston 26 has been moved to its lowermost position, so as to permit the seating of the ball valve 36, fluid under pressure is supplied to the empty brake cylinder at a relatively slow rate through the restricted passage 39. Meanwhile, fluid under pressure is being supplied to the inner seated area of the timing valve piston 40 and to the connected timing chamber 50 in the same manner as hereinbefore described in connection with the effecting of an emergency application of the brakes with the apparatus conditioned for loaded car braking, and when the fluid pressure acting on the inner seated area of said valve piston has been increased to a predetermined degree, the valve piston 40 will be operated to permit the valve 46 to be seated and the valve 45 to be unseated, so as to close the communication through which chamber 28 below the inshot valve piston 26 is vented and to permit fluid under pressure to be supplied to said chamber. With fluid under pressure supplied to chamber 28, the valve piston 26 is operated to unseat the ball valve 36 and thereby open a relatively large communication, by way of passage 34, through which fluid under pressure is supplied to the empty brake cylinder 4 at a rapid rate during the third and final stage of the build-up of empty brake cylinder pressure.

From the foregoing description, it will be seen that when the fluid pressure brake equipment is conditioned for empty car operation, an initial inshot of fluid under pressure of around ten pounds is supplied to the empty brake cylinder whereas when the equipment is conditioned for loaded car operation, the initial inshot of fluid under pressure to the empty brake cylinder is around twenty pounds, so that the inshot brake cylinder pressure is varied according to whether the car is empty or loaded and thus, when loaded cars and empty cars are mixed in the same train, the initial retarding action of the brakes will be more nearly uniform throughout the length of the train.

While one illustrative embodiment of the invention has been described in detail, it is not the intention to limit its scope to that embodiment or otherwise than by the terms of the appended claims.

Having now described the invention, what is claimed as new and desired to be secured by Letters Patent, is:

1. In a fluid pressure brake, in combination, a brake cylinder, means operative to supply fluid under pressure to the brake cylinder, a valve device operative to cut off the flow of fluid under pressure through one communication to the brake cylinder upon a predetermined increase in brake cylinder pressure, another valve device operative to cut off the flow of fluid under pressure to the brake cylinder through another communication at a higher brake cylinder pressure and means for controlling said last named communication and operable to establish or to cut off communication therethrough.

2. In a fluid pressure brake, in combination, a brake cylinder, means operative to supply fluid under pressure to the brake cylinder, a valve device operative to cut off the flow of fluid under pressure through one communication to the brake cylinder upon a predetermined increase in brake cylinder pressure, another valve device operative to cut off the flow of fluid under pressure to the brake cylinder through another communication at a higher brake cylinder pressure, and manually operable means operative to close said second mentioned communication.

3. In a fluid pressure brake, in combination, a brake cylinder, means operative to supply fluid under pressure to the brake cylinder, a valve device operative to cut off the flow of fluid under pressure through one communication to the brake cylinder upon a predetermined increase in brake cylinder pressure, another valve device operative to cut off the flow of fluid under pressure to the brake cylinder through another communication at a higher brake cylinder pressure, means for retarding the rate of flow of fluid under pressure to the brake cylinder when the last mentioned valve device is operated, and means for controlling said last named communication and operable to establish or to cut off communication therethrough.

4. In a fluid pressure brake, in combination, a brake cylinder, means operative to supply fluid under pressure to the brake cylinder, a valve device operative to cut off the flow of fluid under pressure through one communication to the brake cylinder upon a predetermined increase in brake cylinder pressure, another valve device operative to cut off the flow of fluid under pressure to the brake cylinder through another communication at a higher brake cylinder pressure, means for retarding the rate of flow of fluid under pressure to the brake cylinder when the last mentioned valve device is operated, and manually operable means operative to close the last mentioned communication.

5. In a fluid pressure brake, in combination, a brake cylinder, means operative to supply fluid under pressure to the brake cylinder through a restricted communication, a valve device operative at a predetermined brake cylinder pressure for cutting off the flow of fluid under pressure to the brake cylinder through a relatively large communication, a valve device operative at a higher predetermined brake cylinder pressure for cutting off the flow of fluid under pressure through another relatively large communication, and means for controlling said last named communication and operable to establish or to cut off communication therethrough.

6. In a fluid pressure brake, in combination, a brake cylinder, means operative to supply fluid under pressure to the brake cylinder through a restricted communication, a valve device operative at a predetermined brake cylinder pressure to cut off the flow of fluid under pressure to the brake cylinder through another communication, so as to effect a slow flow of fluid under pressure to the brake cylinder through said restricted communication, another valve device operative at a higher predetermined brake cylinder pressure to cut off the flow of fluid under pressure to the brake cylinder through another communication, so as to render the first mentioned valve device effective to effect said slow flow of fluid under pressure to the brake cylinder, and means for controlling said last named communication and operable to establish or to cut off communication therethrough.

7. In a fluid pressure brake, in combination, a brake cylinder, means operative to supply fluid under pressure to the brake cylinder through a restricted communication, a valve device operative at a predetermined brake cylinder pressure to cut off the flow of fluid under pressure to the brake cylinder through another communication, so as to effect a slow flow of fluid under pressure to the brake cylinder through said restricted communication, means adapted to be cut into action to render said valve device ineffective to effect said slow flow of fluid under pressure to the brake cylinder until a higher predetermined brake cylinder pressure is obtained, and means for cutting the second mentioned means into and out of action.

8. In a fluid pressure brake, in combination, a brake cylinder, a timing reservoir, means operative to supply fluid under pressure to the brake cylinder through a restricted communication and through another relatively large communication and to supply fluid under pressure to the timing reservoir, normally open valve means operative upon a predetermined increase in brake cylinder pressure to close said relatively large communication, and valve means operated upon a predetermined increase in fluid pressure in the timing reservoir to effect the operation of said valve means to reopen said relatively large communication.

9. In a fluid pressure brake, in combination, a brake cylinder, means operative to supply fluid under pressure to the brake cylinder through a restricted communication, a valve device operative at a predetermined brake cylinder pressure to cut off the flow of fluid under pressure to the brake cylinder through a relatively large communication, valve means operative at a higher predetermined brake cylinder pressure to cut off the flow of fluid under pressure to the brake cylinder through another relatively large communication, means for controlling said last named communication and operable to establish or to cut off communication therethrough, and means operative after a predetermined time interval to effect the operation of said valve device to again open the first mentioned relatively large communication.

10. In a fluid pressure brake, in combination, a brake cylinder, means operative to supply fluid under pressure to the brake cylinder through a restricted communication, a valve device operative at a predetermined brake cylinder pressure to cut off the flow of fluid under pressure to the brake cylinder through a relatively large communication, valve means operative at a higher predetermined brake cylinder pressure to cut off the flow of fluid under pressure to the brake cylinder through another relatively large communication, means operative after a predetermined time interval to effect the operation of said valve device to again open the first mentioned relatively large communication, and manually operable means operative to one position for establishing the second mentioned relatively large communication and to another position for closing said communication.

11. In a fluid pressure brake, in combination, an empty brake cylinder, a load brake cylinder, means operative to supply fluid under pressure to both brake cylinders for loaded car braking and only to the empty brake cylinder for empty car braking, a valve device operative at a predetermined empty brake cylinder pressure for cutting off the flow of fluid under pressure to the empty brake cylinder through one large flow capacity communication, and a valve device operative in loaded car braking at a greater predetermined empty brake cylinder pressure for cutting off the flow of fluid under pressure to the empty brake cylinder through another large flow capacity communication.

12. In an empty and load fluid pressure brake equipment, in combination, a brake cylinder, means operative to supply fluid under pressure to said brake cylinder through a restricted communication, conditioning means operable to condition the equipment for either empty or load braking, a valve device operative at a predetermined brake cylinder pressure to cut off the flow of fluid under pressure to said brake cylinder through a relatively large communication, valve means operative at a higher predetermined brake cylinder pressure to cut off the flow of fluid under pressure to said brake cylinder through another relatively large communication when said conditioning means is operated to condition the equipment for load braking, and means operative after a predetermined time interval to effect operation of said valve device to again open the first mentioned relatively large communication.

13. In an empty and load fluid pressure brake equipment, in combination, a brake cylinder, means operative to supply fluid under pressure to the brake cylinder, valve means for permitting a relatively rapid initial flow of fluid under pressure to the brake cylinder and operative at a predetermined brake cylinder pressure to retard the rate of flow of fluid under pressure to the brake cylinder, conditioning means operative to condition the equipment for load braking, and comprising means providing a rapid initial flow of fluid under pressure to the brake cylinder when said conditioning means is operated to condition the equipment for load braking and operative at a higher predetermined brake cylinder pressure to cut off the last mentioned initial rapid flow of fluid under pressure to the brake cylinder and thereby render said valve means effective to retard the rate of flow of fluid under pressure to the brake cylinder.

14. In an empty and load fluid pressure brake equipment, in combination, a brake cylinder, means operative to supply fluid under pressure to the brake cylinder, valve means for permitting a relatively rapid initial flow of fluid under pressure to the brake cylinder and operative at a predetermined brake cylinder pressure to retard the rate of flow of fluid under pressure to the brake cylinder, conditioning means operative to condition the equipment for load braking and comprising means rendering said valve means temporarily ineffective to control the rate of flow of fluid under pressure to the brake cylinder and operative at a higher predetermined brake cylinder pressure to render said valve means effective to retard the rate of flow of fluid under pressure to the brake cylinder.

15. In an empty and load fluid pressure brake equipment, in combination, an auxiliary reservoir, a brake cylinder, means for supplying fluid under pressure from said reservoir to the brake cylinder, valve means responsive to the pressure of the fluid in the brake cylinder and controlling a passage through which fluid is supplied to the brake cylinder and operable upon a predetermined increase in the brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in brake cylinder pressure to cut off the flow of fluid to the brake cylinder through the passage controlled thereby, and means for controlling said last-named passage and operable to establish or cut off communication therethrough.

16. In an empty and load fluid pressure brake equipment, in combination, an auxiliary reservoir, a load reservoir, a brake cylinder, means for supplying fluid under pressure from said reservoirs to said brake cylinder, valve means responsive to the pressure of the fluid in the brake cylinder and controlling a passage through which fluid is supplied to the brake cylinder and operable upon a predetermined increase in brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in the brake cylinder pressure to cut off the flow of fluid to the brake cylinder through the passage controlled thereby, and valve means for controlling said last-named passage and operable to establish or to cut off communication therethrough.

17. In an empty and load fluid pressure brake equipment, in combination, an auxiliary reservoir, a load reservoir, a brake cylinder, means for supplying fluid under pressure from said reservoirs to said brake cylinder, valve means responsive to the pressure of the fluid in the brake cylinder and controlling a passage through which fluid is supplied to the brake cylinder and operable upon a predetermined increase in brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in the brake cylinder pressure to cut off the flow of fluid to the brake cylinder through the passage controlled thereby, and valve means controlling the passage between the load reservoir and the brake cylinder and operable to cut off or to establish communication through said passage.

18. In an empty and load fluid pressure brake equipment, in combination, an auxiliary reservoir, a load reservoir, a brake cylinder, means for supplying fluid under pressure from said reservoirs to said brake cylinder, valve means responsive to the pressure of the fluid in the brake cylinder and controlling a passage through which fluid is supplied to the brake cylinder and operable upon a predetermined increase in brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in the brake cylinder pressure to cut off the flow of fluid to the brake cylinder through the passage controlled thereby, and a valve device controlling said last-named passage and controlling the passage between the load reservoir and the brake cylinder, the valve device having one position in which communication through the passages controlled thereby is cut off, and another position in which communication through the passages controlled thereby is established.

19. In an empty and load fluid pressure brake equipment, in combination, an auxiliary reservoir, a brake cylinder, means for supplying fluid under pressure from said reservoir to the brake cylinder, valve means responsive to the pressure of the fluid in the brake cylinder and controlling a passage through which fluid is supplied to the brake cylinder and operable upon a predetermined increase in the brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in brake cylinder pressure to cut off the flow of fluid to the brake cylinder through the passage controlled thereby, means for controlling said last-named passage and operable to establish or cut off communication therethrough, and means operative after a predetermined time interval to effect operation of one of said valve means to open the passage controlled thereby.

20. In an empty and load fluid pressure brake equipment, in combination, an auxiliary reservoir, a brake cylinder, means for supplying fluid under pressure from said reservoir to the brake cylinder, valve means responsive to the pressure of the fluid in the brake cylinder and controlling a passage through which fluid is supplied to the brake cylinder and operable upon a predetermined increase in the brake cylinder pressure to cut off the flow of fluid to the brake cylinder through said passage, other valve means responsive to the pressure of the fluid in the brake cylinder and controlling another passage through which fluid is supplied to the brake cylinder and operable upon a higher predetermined increase in brake cylinder pressure to cut off the flow of fluid to the brake cylinder through the passage controlled thereby, means for controlling said last-named passage and operable to establish or cut off communication therethrough, means operative after a predetermined time interval to effect operation of one of said valve means to open the passage controlled thereby, and means for cutting the last-named means into or out of operation.

21. In an empty and load fluid pressure brake equipment, in combination, an auxiliary reservoir, a load reservoir, an empty brake cylinder, a load brake cylinder, means for supplying fluid under pressure from said reservoirs to said brake cylinders, valve means responsive to the pressure of the fluid in the empty brake cylinder and controlling a passage through which fluid is supplied to the empty brake cylinder and operable upon a predetermined increase in the brake cylinder pressure to cut off the flow of fluid through said passage, other valve means responsive to the pressure of the fluid in the empty brake cylinder and controlling another passage through which fluid is supplied to the empty brake cylinder and controlling the passage through which fluid is supplied to the load brake cylinder and operable on a higher predetermined increase in the pressure of the fluid in the empty brake cylinder to cut off the flow of fluid to the empty brake cylinder through the passage controlled thereby and to open communication to the load brake cylinder through the passage controlled thereby.

22. In an empty and load fluid pressure brake equipment, in combination, an auxiliary reservoir, a load reservoir, an empty brake cylinder, a load brake cylinder, means for supplying fluid under pressure from said reservoirs to said brake cylinders, valve means responsive to the pressure of the fluid in the empty brake cylinder and controlling a passage through which fluid is supplied to the empty brake cylinder and operable upon a predetermined increase in the brake cylinder pressure to cut off the flow of fluid through said passage, other valve means responsive to the pressure of the fluid in the empty brake cylinder and controlling another passage through which fluid is supplied to the empty brake cylinder and controlling the passage through which fluid is supplied to the load brake cylinder, and operable on a higher predetermined increase in the pressure of the fluid in the empty brake cylinder to cut off the flow of fluid to the empty brake cylinder through the passage controlled thereby and to open communication to the load brake cylinder through the passage controlled thereby, and a valve device controlling the passage associated with the last-named pressure responsive valve means and operable to cut off or to establish communication through said passage.

23. In an empty and load fluid pressure brake equipment, in combination, an auxiliary reservoir, a load reservoir, an empty brake cylinder, a load brake cylinder, means for supplying fluid under pressure from said reservoirs to said brake cylinders, valve means responsive to the pressure of the fluid in the empty brake cylinder and controlling a passage through which fluid is supplied to the empty brake cylinder and operable upon a predetermined increase in the brake cylinder pressure to cut off the flow of fluid to said passage, other valve means responsive to the pressure of the fluid in the empty brake cylinder and controlling another passage through which fluid is supplied to the empty brake cylinder and controlling the passage through which fluid is supplied to the load brake cylinder and operable on a higher predetermined increase in the pressure of the fluid in the empty brake cylinder to cut off the flow of fluid to the empty brake cylinder through the passage controlled thereby and to open communication to the load brake cylinder through the passage controlled thereby, and a valve device controlling the passage associated with the last-named pressure responsive valve means and controlling the passage through which fluid is supplied from the load reservoir to the brake cylinders, the valve device having one position in which communication through said passages is cut off and another position in which communication through said passages is established.

DORIS BROWN DEAN.
*Executrix of the Last Will and Testament of William E. Dean, Jr., Deceased.*